United States Patent [19]
Dennis et al.

[11] Patent Number: 5,357,806
[45] Date of Patent: Oct. 25, 1994

[54] CAPACITIVE DIFFERENTIAL PRESSURE SENSOR AND METHOD OF MEASURING DIFFERENTIAL PRESSURE AT AN OIL OR GAS WELL

[75] Inventors: John R. Dennis; Steven L. Cook; Monty E. McElroy; Charles D. Totty, all of Duncan, Okla.

[73] Assignee: Halliburton Company, Duncan, Okla.

[21] Appl. No.: 56,095

[22] Filed: May 3, 1993

[51] Int. Cl.$^5$ .................................................. G01L 9/12
[52] U.S. Cl. .................................... 73/718; 73/152; 361/283.3; 361/283.4
[58] Field of Search .................... 73/718, 152, 706; 361/283.1, 283.2, 283.3, 283.4

[56] References Cited

U.S. PATENT DOCUMENTS

| | | | |
|---|---|---|---|
| 4,020,448 | 4/1977 | Corbett | 340/8 S |
| 4,067,241 | 1/1978 | Corbett | 73/717 |
| 4,439,705 | 3/1984 | Corbett | 310/338 |
| 4,485,323 | 11/1984 | Corbett | 310/338 |
| 4,996,627 | 2/1991 | Zias et al. | 361/283 |
| 5,019,783 | 5/1991 | Cadwell | 324/662 |
| 5,048,165 | 9/1991 | Cadwell | 73/718 X |
| 5,157,973 | 10/1992 | Ciminelli | 73/718 |

Primary Examiner—Richard E. Chilcot, Jr.
Assistant Examiner—Joseph L. Felber
Attorney, Agent, or Firm—James R. Duzan; Stephen R. Christian; E. Harrison Gilbert, III

[57] ABSTRACT

A capacitive differential pressure sensor comprises two end pieces and a central diaphragm all of the same type of electrically non-conductive material, such as quartz. As the central diaphragm moves relative to the end pieces in response to pressures applied through the end pieces, capacitance changes are sensed through one pair of facing electrodes on one end piece and the diaphragm and another pair of facing electrodes on the other end piece and the diaphragm. A method of measuring differential pressures at an oil or gas well with such a sensor is also disclosed.

18 Claims, 1 Drawing Sheet

CAPACITIVE DIFFERENTIAL PRESSURE SENSOR AND METHOD OF MEASURING DIFFERENTIAL PRESSURE AT AN OIL OR GAS WELL

BACKGROUND OF THE INVENTION

This invention relates generally to a capacitive differential pressure sensor and method using the same at oil or gas wells.

Differential pressures can be measured by linearly variable differential transducers or strain gauges. These instruments typically are large and have maximum static pressure ratings on the order of 5,000 pounds per square inch (psi). The ones we are aware of are capable of measuring pressure differentials on the order of 50 psi with an accuracy of ±1 percent. We are also aware of a capacitive differential pressure transducer using a semiconductor diaphragm between two glass end pieces (see U.S. Pat. No. 4,996,627 to Zias et al.). Although these devices can measure pressure differentials, there is the need for an improved sensor and method of sensing that can be used in the high pressure, high temperature environments found at oil or gas wells.

SUMMARY OF THE INVENTION

The present invention meets the above-noted need by providing a novel and improved differential pressure sensor and method of measuring differential pressure at an oil or gas well. Contemplated advantages of the present invention include its static pressure capability, sensitivity, accuracy, and small size. Furthermore, the sensor of the present invention is bidirectional (i.e., it will sense a differential in either of two directions), and it can be temperature compensated.

The differential pressure sensor of the present invention is a capacitive type and it comprises: a first crystal member; a first electrode, connected to the first crystal member; a second crystal member; a second electrode, connected to the second crystal member; a third crystal member, connected between the first and second crystal members so that at least a portion of the third crystal member moves relative to the first and second crystal members in response to a difference in pressure applied to the third crystal member through the first and second crystal members; a third electrode, connected to the third crystal member so that a first electrical capacitance between the first and third electrodes varies in response to movement of the third crystal member relative to the first crystal member; and a fourth electrode, connected to the third crystal member so that a second electrical capacitance between the second and fourth electrodes varies in response to movement of the third crystal member relative to the second crystal member.

The method of the present invention comprises: disposing a differential pressure sensor at an oil or gas well, the differential pressure sensor including: a first crystal member; a first electrode, connected to the first crystal member; a second crystal member; a second electrode, connected to the second crystal member; a third crystal member, connected between the first and second crystal members so that at least a portion of the third crystal member moves relative to the first and second crystal members in response to a difference in pressure applied to the third crystal member through the first and second crystal members; a third electrode, connected to the third crystal member so that a first electrical capacitance between the first and third electrodes varies in response to movement of the third crystal member relative to the first crystal member; and a fourth electrode, connected to the third crystal member so that a second electrical capacitance between the second and fourth electrodes varies in response to movement of the third crystal member relative to the second crystal member; exposing the differential pressure sensor to two pressures at the well; communicating one of the pressures through the first crystal member to act against the third crystal member; communicating the other pressure through the second crystal member to act against the third crystal member in opposition to the pressure communicated through the first crystal member; sensing through the first and third electrodes a change in a first capacitance responsive to relative movement between the first and third crystal members caused by the communicated pressures; sensing through the second and fourth electrodes a change in a second capacitance responsive to relative movement between the second and third crystal members caused by the communicated pressures; and determining the difference between the pressure communicated through the first crystal member and the pressure communicated through the second crystal member in response to the difference between the first and second capacitances.

Therefore, from the foregoing, it is a general object of the present invention to provide a novel and improved differential pressure sensor and method of measuring differential pressure at an oil or gas well. Other and further objects, features and advantages of the present invention will be readily apparent to those skilled in the art when the following description of the preferred embodiment is read in conjunction with the accompanying drawings.

DETAILED DESCRIPTION OF PREFERRED EMBODIMENT

Figure 1:
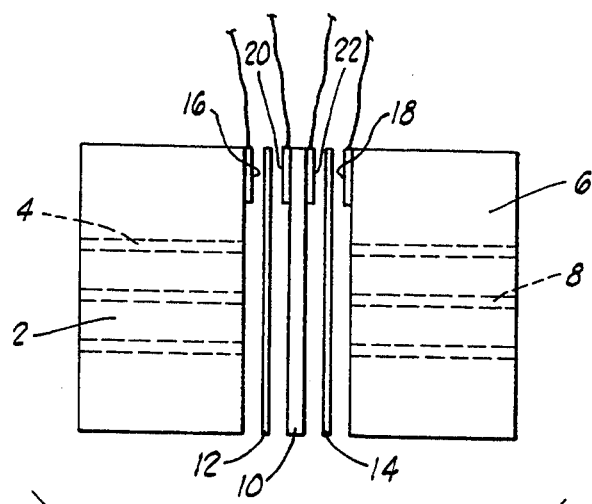
FIG. 1 is an schematic exploded representation of the preferred embodiment differential pressure sensor of the present invention.
Figure 2:
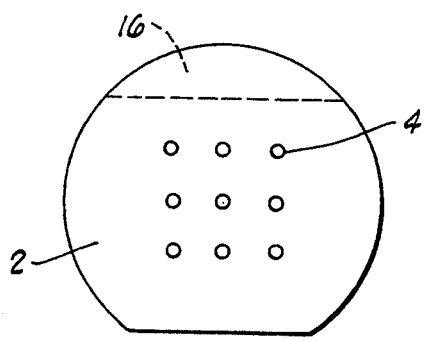
FIG. 2 is one end view of the sensor depicted in FIG. 1.
Figure 3:
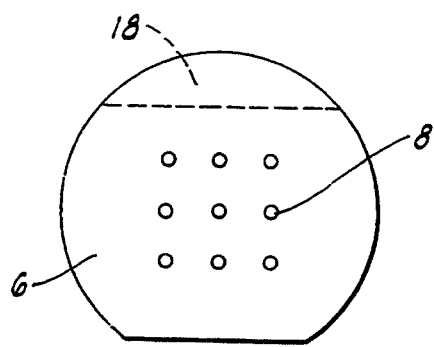
FIG. 3 is an opposite end view of the sensor depicted in FIG. 1.

The operating principle of the present invention utilizes capacitance to detect differential pressure. Capacitance of a capacitor having parallel circular electrodes is directly proportional to electrode diameter and inversely proportional to plate separation.

The sensor is a three-piece package comprising a thin circular quartz plate sealed between two thicker circular quartz end plates. The end plates preferably are vented with dielectric fluid filling the space between the end plates and the central plate. Chrome/gold electrodes are evaporated on either side of the center plate and on the inner side of each of the end plates.

When sealed, the package defines two distinct parallel plate capacitors separated by the thickness of the center plate. End plate to center plate separation is determined by the thickness of the sealing glass, about 0.002 inches for example. The presence of a pressure differential causes a displacement of the center plate, resulting in an increase of plate separation for one capacitor and a corresponding decrease for the other. The magnitude of the differential is related to the resulting difference in capacitance values which are dependent on plate separation. In the absence of a pressure differential, the center plate is at equilibrium and both capacitors will indicate essentially the same values.

Since the sensor is symmetrical, the differential pressure can be sensed in either direction. In addition, the dual capacitors can be used to help cancel out and/or compensate for temperature effects which through dimensional changes or fluid dielectric changes could affect the measurement.

The preferred material for the new sensor of the present invention is Z-cut cultured crystalline quartz. This material is chosen for its stable properties and the absence of piezoelectric effects in the principal axis.

Referring to the drawings, the differential pressure sensor of the present invention comprises an electrically non-conductive end quartz member 2 that has a plurality of vent holes 4 defined therethrough. The differential pressure sensor also comprises an electrically non-conductive end quartz member 6 that has a plurality of vent holes 8. The vent holes 4, 8 are formed in any suitable manner, such as by drilling using a small diamond drill.

An electrically non-conductive center quartz member 10 is connected between the quartz members 4, 6 with dielectric material 12 (such as sebecate oil) retained between the quartz members 2, 10 and with dielectric material 14 (such as sebecate oil) retained between the quartz members 6, 10. The dielectric material is retained by surface tension so that it does not leak through the vent holes.

These components are bonded together using a suitable bonding material, such as glass frits, as known in the art. Although very small, there is sufficient space between the crystal members 2, 10 and between the crystal members 6, 10 so that at least a portion of the center quartz member 10 moves relative to the end quartz members 2, 6 in response to a difference in pressure applied to the center quartz member 10 through the vent holes 4, 8 and the dielectric material 12, 14.

To sense the capacitance change when such movement occurs, the sensor of the present invention further comprises an electrode 16 connected to the end quartz member 2 without covering the plurality of vent holes 4. Also included is an electrode 18 connected to the end quartz member 6 without covering the plurality of vent holes 8.

An electrode 20 is connected to the center quartz member 10 so that when the sensor is assembled the electrode 20 faces the electrode 16. An electrical capacitance varies between the electrodes 16, 20 in response to movement of the center quartz member 10 relative to the end quartz member 2.

Similarly, an electrode 22 is connected to the center quartz member 10 facing the electrode 18 so that an electrical capacitance varies between the electrodes 18, 22 in response to movement of the center quartz member 10 relative to the end quartz member 6.

The electrodes are of suitable types, such as the chrome/gold type mentioned above. They are affixed to the surfaces of the respective crystal members in known manner.

As mentioned above, each of the crystal members 2, 6, 10 preferably includes a respective Z-cut quartz plate. The quartz members 2, 6, 10 also preferably have the same thermal expansion characteristic so that they will be affected similarly by temperature.

The present invention also provides a method of measuring differential pressure at an oil or gas well. A differential pressure sensor (preferably the sensor just described) is disposed at the well. In a specific application, the sensor is lowered into the well. This is preferably done in a known conventional manner, such as by using a tool string of which the sensor is a part or by using a wireline or slickline to lower a tool carrying the sensor into the well. The sensor can also be used at the surface.

Once the sensor is disposed at the well (whether inside or outside the well), it is exposed to at least two pressures. In the preferred embodiment, the method also comprises exposing the differential pressure sensor to temperature at the well so that each of the three crystal members responds to such temperature with the same thermal expansion characteristic.

When the sensor is exposed to the pressures at the well, one of the pressures is communicated through the end crystal 2 to act against the center crystal member 10. The other pressure is communicated through the end crystal member 6 to act against the center crystal member 10 in opposition to the pressure communicated through the end crystal member 2. For the sensor shown in the drawings as used in the preferred embodiment of the present invention, such communication of pressures occurs by providing the plurality of holes through the respective end crystal member and retaining the pressure conductive dielectric material between the respective end crystal member and the center crystal member.

The method further comprises sensing through the pair of electrodes 16, 20 a change in the capacitance that is responsive to relative movement between the crystal members 2, 10 caused by the communicated pressures. The method also comprises sensing through the electrodes 18, 22 a change in the capacitance that is responsive to relative movement between the crystal members 6, 10 caused by the communicated pressures. In response to the difference between these two capacitances, the method determines the difference between the pressure communicated through the end crystal member 2 and the pressure communicated through the end crystal member 6. These steps can be implemented using known oscillator and differencing circuitry. For example, each capacitance can affect the output frequency of a respective oscillator circuit to which the respective electrode pair is connected. The output signals from these oscillator circuits can be combined into an electrical signal having a frequency representing the difference between the frequencies of these two signals and thus also representing the differential pressure sensed by the sensor and the method of the present invention.

In the preferred embodiment of the method of the present invention, each of the communicated pressures at (particularly, within) the well is within the range between atmospheric pressure and about 20,000 pounds per square inch (psi).

When used within a well, the present invention can be used for measuring various pressure differentials, such as differences in pressure between downhole tubing and the annulus outside the tubing, for example. Other uses both inside and outside the well itself are also contemplated, such as, for example, measuring friction loss in flow lines, static fluid density and flowing gas density.

Four sensors constructed with single vent holes and with liquid dielectric material have been tested in a laboratory. Two center plate thicknesses were evaluated: 0.010 and 0.015 inch. Overall diameter of the sensor was 0.575 inch with lengths of 0.300 and 0.305 inch. Test results indicate that maximum differential pressures exceeding 50 psi and sensitivities of 0.25 psi are possible. Maximum static pressure is expected to be 20,000 psi with maximum differentials of about 100 psi. A larger active flexure area for the center plate should help to compensate somewhat for a loss in sensitivity expected with increases in center plate thickness.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. A capacitive differential pressure sensor, comprising:
   a first crystal member;
   a first electrode, connected to said first crystal member;
   a second crystal member;
   a second electrode, connected to said second member;
   a third crystal member, connected between said first and second crystal members so that at least a portion of said third crystal member moves relative to said first and second crystal members in response to a difference in pressure applied to said third crystal member through said first and second crystal members;
   a third electrode, connected to said third crystal member so that a first electrical capacitance between said first and third electrodes varies in response to movement of said third crystal member relative to said first crystal member; and
   a fourth electrode, connected to said third crystal member so that a second electrical capacitance between said second and fourth electrodes varies in response to movement of said third crystal member relative to said second crystal member;
   wherein each of said first, second and third crystal members includes a respective Z-cut quartz plate.

2. A capacitive differential pressure sensor as defined in claim 1, wherein each said quartz plate has the same thermal expansion characteristic.

3. A capacitive differential pressure sensor as defined in claim 1, further comprising dielectric material disposed between said first and third crystal members and between said second and third crystal members.

4. A capacitive differential pressure sensor, comprising:
   an electrically non-conductive first quartz member, having a first plurality of vent holes defined therethrough;
   a first electrode, connected to said first quartz member without covering said first plurality of vent holes;
   an electrically non-conductive second quartz member, having a second plurality of vent holes;
   a second electrode, connected to said second quartz member without covering said second plurality of vent holes;
   first dielectric material;
   second dielectric material;
   an electrically non-conductive third quartz member, connected between said first and second quartz members with said first dielectric material retained between said first and third quartz members and said second dielectric material retained between said second and third quartz members so that at least a portion of said third quartz member moves relative to said first and second quartz members in response to a difference in pressure applied to said third quartz member through said first and second vent holes and said first and second dielectric materials;
   a third electrode, connected to said third quartz member facing said first electrode so that a first electrical capacitance varies between said first and third electrodes in response to movement of said third quartz member relative to said first quartz member; and
   a fourth electrode, connected to said third quartz member facing said second electrode so that a second electrical capacitance varies between said second and fourth electrodes in response to movement of said third quartz member relative to said second quartz member;
   wherein each of said first, second and third quartz members includes a respective Z-cut quartz plate.

5. A capacitive differential pressure sensor as defined in claim 4, wherein each said quartz member has the same thermal expansion characteristic.

6. A method of measuring differential pressure at an oil or gas well, comprising:
   disposing a differential pressure sensor at an oil or gas well, the differential pressure sensor including: a first Z-cut quartz crystal member; a first electrode, connected to the first Z-cut quartz crystal member; a second Z-cut quartz crystal member; a second electrode, connected to the second Z-cut quartz crystal member; a third Z-cut quartz crystal member, connected between the first and second Z-cut quartz crystal members so that at least a portion of the third Z-cut quartz crystal member moves relative to the first and second Z-cut quartz crystal members in response to a difference in pressure applied to the third Z-cut quartz crystal member through the first and second Z-cut quartz crystal members; a third electrode, connected to the third Z-cut quartz crystal member so that a first electrical capacitance between the first and third electrodes varies in response to movement of the third Z-cut quartz crystal member relative to the first Z-cut quartz crystal member; and a fourth electrode, connected to the third Z-cut quartz crystal member so that a second electrical capacitance between the second and fourth electrodes varies in response to movement of the third Z-cut quartz crystal member relative to the second Z-cut quartz crystal member;
   exposing the differential pressure sensor to two pressures at the well;
   communicating one of the pressures through the first Z-cut quartz crystal member to act against the third Z-cut quartz crystal member;

communicating the other pressure through the second Z-cut quartz crystal member to act against the third Z-cut quartz crystal member in opposition to the pressure communicated through the first Z-cut quartz crystal member;

sensing through the first and third electrodes a change in a first capacitance responsive to relative movement between the first and third Z-cut quartz crystal members caused by the communicated pressures;

sensing through the second and fourth electrodes a change in a second capacitance responsive to relative movement between the second and third Z-cut quartz crystal members caused by the communicated pressures; and determining the difference between the pressure communicated through the first Z-cut quartz crystal member and the pressure communicated through the second Z-cut quartz crystal member in response to the difference between the first and second capacitances.

7. A method as defined in claim 6, wherein each of the communicated pressures at the well is within the range between atmospheric pressure and about 20,000 pounds per square inch.

8. A method as defined in claim 7, wherein:

said communicating one of the pressures includes providing a plurality of holes through the first crystal member and retaining a pressure conductive dielectric material between the first and third crystal members; and said communicating the other pressure includes providing a plurality of holes through the second crystal member and retaining a pressure conductive dielectric material between the second and third crystal members.

9. A method as defined in claim 8, further comprising exposing the differential pressure sensor to temperature at the well so that each of the first, second and third crystal members responds thereto with the same thermal expansion characteristic.

10. A method as defined in claim 6, wherein:

said communicating one of the pressures includes providing a plurality of holes through the first crystal member and retaining a pressure conductive dielectric material between the first and third crystal members; and said communicating the other pressure includes providing a plurality of holes through the second crystal member and retaining a pressure conductive dielectric material between the second and third crystal members.

11. A method as defined in claim 6, further comprising exposing the differential pressure sensor to temperature at the well so that each of the first, second and third crystal members responds thereto with the same thermal expansion characteristic.

12. A method as defined in claim 6, wherein:

disposing a differential pressure sensor at the oil or gas well includes lowering the differential pressure sensor into the well; and exposing the differential pressure sensor to two pressures at the well includes exposing the differential pressure sensor to two pressures which are in the well.

13. A method as defined in claim 12, wherein each of the pressures within the well is within the range between atmospheric pressure and about 20,000 pounds per square inch.

14. A method as defined in claim 12, further comprising exposing the differential pressure sensor to temperature in the well so that each of the first, second and third crystal members responds thereto with the same thermal expansion characteristic.

15. A method of measuring differential pressure in a high pressure environment in an oil or gas well, comprising:

lowering a differential pressure sensor into an oil or gas well which has a high pressure environment wherein maximum static pressure is 20,000 pounds per square inch, the differential pressure sensor including: a first electrically non-conductive crystal member; a first electrode, connected to the first crystal member; a second electrically non-conductive crystal member; a second electrode, connected to the second crystal member; a third electrically non-conductive crystal member, connected between the first and second crystal members so that at least a portion of the third crystal member moves relative to the first and second crystal members in response to a difference in pressure applied to the third crystal member through the first and second crystal members within the high pressure environment of the well; a third electrode, connected to the third crystal member so that a first electrical capacitance between the first and third electrodes varies in response to movement of the third crystal member relative to the first crystal member; and a fourth electrode, connected to the third crystal member so that a second electrical capacitance between the second and fourth electrodes varies in response to movement of the third crystal member relative to the second crystal member;

exposing the differential pressure sensor to two pressures in the high pressure environment of the well;

communicating within the high pressure environment one of the two pressures through the first crystal member to act against the third crystal member;

communicating within the high pressure environment the other of the two pressures through the second crystal member to act against the third crystal member in opposition to the pressure communicated through the first crystal member;

sensing through the first and third electrodes a change in a first capacitance responsive to relative movement between the first and third crystal members caused by the communicated pressures;

sensing through the second and fourth electrodes a change in a second capacitance responsive to relative movement between the second and third crystal members caused by the communicated pressures; and determining the difference between the pressure of the high pressure environment of the well communicated through the first crystal member and the pressure of the high pressure environment of the well communicated through the second crystal member in response to the difference between the first and second capacitances.

16. A method as defined in claim 15, wherein:

said communicating one of the two pressures includes providing a plurality of holes through the first crystal member and retaining a pressure conductive dielectric material between the first and third crystal members; and said communicating the other of the two pressures includes providing a plurality of holes through the second crystal member and retaining a pressure conductive dielectric material between the second and third crystal members.

17. A method as defined in claim 16, further comprising exposing the differential pressure sensor to temperature in the well so that each of the first, second and third crystal members responds thereto with the same thermal expansion characteristic.

18. A method as defined in claim 15, further comprising exposing the differential pressure sensor to temperature in the well so that each of the first, second and third crystal members responds thereto with the same thermal expansion characteristic.

* * * * *